US011477002B2

(12) United States Patent
Valadeau et al.

(10) Patent No.: US 11,477,002 B2
(45) Date of Patent: Oct. 18, 2022

(54) METHOD AND SYSTEM FOR SYNCHRONIZING COMPUTERS

(71) Applicant: Airbus Operations (S.A.S.), Toulouse (FR)

(72) Inventors: Pierre Valadeau, Toulouse (FR); Matthieu Boitrel, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 17/223,808

(22) Filed: Apr. 6, 2021

(65) Prior Publication Data

US 2021/0328755 A1 Oct. 21, 2021

(30) Foreign Application Priority Data

Apr. 7, 2020 (FR) ..................... 2003475

(51) Int. Cl.
*H04L 29/08* (2006.01)
*H04L 7/00* (2006.01)
*H04L 67/12* (2022.01)

(52) U.S. Cl.
CPC ............ *H04L 7/0037* (2013.01); *H04L 67/12* (2013.01)

(58) Field of Classification Search
CPC ......... H04L 7/0037; H04L 67/12; G05B 9/03; G05D 1/0077; G06F 1/12
See application file for complete search history.

(56) References Cited

U.S. PATENT DOCUMENTS

| | | | |
|---|---|---|---|
| 9,168,995 B2 | 10/2015 | Brot et al. | |
| 2007/0271010 A1* | 11/2007 | Kossentini | G06F 11/188 701/14 |
| 2011/0118906 A1* | 5/2011 | Fervel | B64C 13/503 701/3 |
| 2018/0205477 A1* | 7/2018 | Yang | H04J 3/0667 |
| 2020/0164965 A1 | 5/2020 | Fervel | |

FOREIGN PATENT DOCUMENTS

| | | |
|---|---|---|
| EP | 0 306 211 A2 | 3/1989 |
| EP | 0 306 211 A3 | 9/1990 |
| EP | 2 717 108 A1 | 4/2014 |
| EP | 3 667 438 A1 | 6/2020 |

OTHER PUBLICATIONS

French Search Report for Application No. 2003475 dated Dec. 3, 2020.

* cited by examiner

*Primary Examiner* — Kim T Nguyen
(74) *Attorney, Agent, or Firm* — Jenkins, Wilson, Taylor & Hunt, PA

(57) ABSTRACT

A method and system for synchronizing computers includes a bit computing module for computing of a bit by each computer, an exchange module, a bit signal pair determination module for determining a bit signal pair including the computed bit, a bit product pair determination module for determining a bit product pair indicating which bit equal to 1 of the bit signal pair of a computer can be combined with the bit of the bit signal pair determined for the other computer in the iteration n−1, a bit remainder pair determination module for determining a bit remainder pair indicating which bit equal to 1 of the bit signal pair of a computer in the iteration n is different from the bit of the bit signal pair of the other computer in the iteration n−1, a synchronized signal determination module for determining a synchronized signal based on the bit product pair and on the bit remainder pair.

16 Claims, 3 Drawing Sheets

METHOD AND SYSTEM FOR SYNCHRONIZING COMPUTERS

CROSS-REFERENCE TO RELATED APPLICATION

This application claims priority to French Patent Application FR 2003475 filed Apr. 7, 2020, the entire disclosure of which is incorporated by reference herein.

TECHNICAL FIELD

The disclosure herein relates to the synchronization of computers. It relates in particular to a method and to a system for synchronizing two computers that are intended in particular to control aircraft control surfaces.

BACKGROUND

Modern aircraft, in particular transport planes, comprise a set of flight control computers that compute control orders for actuators of control surfaces of the aircraft. The flight control computers are dissimilar and redundant, such that the flight control system is robust to faults that are liable to affect certain computers. In addition, more generally, a portion of the computers are used in control mode (COM) and another portion of the computers are used in monitoring mode (MON). A computer in monitoring mode monitors the operation of a computer in control mode. The computers are thus distributed in COM/MON pairs.

Document EP 19206101.8 describes a flight control system for an aircraft. This flight control system comprises a set of flight control order computing devices and a set of control actuators for the aircraft. These computing devices comprise two similar modules. One module corresponds to a computer acting in control mode, and the other module corresponds to a computer acting in monitoring mode. It is necessary to synchronize the two computers in order to allow automatic piloting laws to be implemented robustly.

SUMMARY

The subject matter herein aims to overcome this problem by disclosing a system and a method for synchronizing a first computer and a second computer.

To this end, the disclosure herein relates to a method for synchronizing a first computer and a second computer, each of the computers being configured so as to compute control orders intended to control a control surface actuator of an aircraft in accordance with one and the same piloting law, each of the computers comprising a clock, the clocks being synchronized with one another, the first computer having an advance or a delay with respect to the second computer, the advance and the delay being unknown and limited in terms of time.

According to the disclosure herein, the method comprises a set of steps implemented iteratively, the set of steps implemented in each iteration n comprising:
  a computing step, implemented by a computing module, consisting in or comprising each of the computers computing a bit, the bit being equal to 0 if the control order computed by each of the computers in the iteration n is equal to the control order computed in the iteration n−1, the bit otherwise being equal to 1;
  an exchange step, implemented by an exchange module, consisting in or comprising each of the computers exchanging the computed bit;
  a signal pair determination step, implemented by a signal pair determination module, consisting in or comprising each of the computers determining a bit signal pair, the bit signal pair comprising the bit computed by each of the computers;
  a product pair determination step, implemented by a product pair determination module, consisting in or comprising each of the computers determining a bit product pair, the bit product pair indicating which bit equal to 1 of the bit signal pair determined for one of the computers in the iteration n is equal to the bit of the bit signal pair determined for the other of the computers in the iteration n−1;
  a remainder pair determination step, implemented by a remainder pair determination module, consisting in or comprising each of the computers determining a bit remainder pair, the bit remainder pair indicating which bit equal to 1 of the bit signal pair determined for one of the computers in the iteration n is different from the bit of the bit signal pair determined for the other of the computers in the iteration n−1;
  a synchronized signal determination step, implemented by a synchronized signal determination module, consisting in or comprising each of the computers determining a synchronized signal based on the bit product pair and on the bit remainder pair.

Thus, by virtue of the method, the control orders computed by the two computers are synchronized.

In addition, the computing step comprises the following substeps:
  a first computing substep, implemented by a first computing submodule of the first computer, consisting in or comprising computing a first bit, the first bit being equal to 0 if the control order $Ia(n)$ computed by the first computer in the iteration n is equal to the control order $Ia(n-1)$ computed in the iteration n−1, the first bit otherwise being equal to 1;
  a second computing substep, implemented by a second computing submodule of the second computer, consisting in or comprising computing a second bit, the second bit being equal to 0 if the control order $Ib(n)$ computed by the second computer in the iteration n is equal to the control order $Ib(n-1)$ computed in the iteration n−1, the second bit otherwise being equal to 1.

Furthermore, the exchange step comprises the following substeps:
  a first transmission substep, implemented by a first transmission submodule of the first computer, consisting in or comprising transmitting the first bit to the second computer;
  a second transmission substep, implemented by a second transmission submodule of the second computer, consisting in or comprising transmitting the second bit to the first computer.

Moreover, the signal pair determination step comprises the following substeps:
  a first determination substep, implemented by a first determination submodule of the first computer, consisting in or comprising determining a first bit signal pair $$Sa(n) = \begin{Bmatrix} sa0 \\ sa1 \end{Bmatrix}$$

in which sa0 is a specific bit equal to the first bit computed in the iteration n−1 and sa1 is an opposite bit equal to the second bit computed in the iteration n−1;

a second determination substep, implemented by a second determination submodule of the second computer, consisting in or comprising determining a second bit signal pair $$Sb(n) = \begin{Bmatrix} sb0 \\ sb1 \end{Bmatrix}$$

in which sb0 is a specific bit equal to the second bit computed in the iteration n−1 and sb1 is an opposite bit equal to the first bit computed in the iteration n−1.

According to one particular feature, the product pair determination step comprises the following substeps:

a third determination substep, implemented by a third determination submodule of the first computer, consisting in or comprising determining a first bit product pair $$Pa(n) = \begin{Bmatrix} pa0 \\ pa1 \end{Bmatrix}$$

in which pa0 is a specific bit and pa1 is an opposite bit, $$Pa(n) = \begin{Bmatrix} 1 \\ 1 \end{Bmatrix}$$

if $$\left(Ra(n-1) = \begin{Bmatrix} 1 \\ 1 \end{Bmatrix} \text{ or } Ra(n-1) = \begin{Bmatrix} 0 \\ 0 \end{Bmatrix}\right) \text{ and } Sa(n) = \begin{Bmatrix} 1 \\ 1 \end{Bmatrix},$$

Ra(n−1) corresponding to a bit remainder pair determined in the iteration n−1, $$Pa(n) = \begin{Bmatrix} 1 \\ 0 \end{Bmatrix}$$

if $$\left(Ra(n-1) = \begin{Bmatrix} 0 \\ 1 \end{Bmatrix} \text{ and } Sa(n) = \begin{Bmatrix} 1 \\ 1 \end{Bmatrix}\right)$$

$$\text{or} \left(Ra(n-1) = \begin{Bmatrix} 0 \text{ or } 1 \\ 1 \end{Bmatrix} \text{ and } Sa(n) = \begin{Bmatrix} 1 \\ 0 \end{Bmatrix}\right),$$

$$Pa(n) = \begin{Bmatrix} 0 \\ 1 \end{Bmatrix}$$

if $$\left(Ra(n-1) = \begin{Bmatrix} 1 \\ 0 \end{Bmatrix} \text{ and } Sa(n) = \begin{Bmatrix} 1 \\ 1 \end{Bmatrix}\right)$$

$$\text{or} \left(Ra(n-1) = \begin{Bmatrix} 1 \\ 1 \text{ or } 0 \end{Bmatrix} \text{ and } Sa(n) = \begin{Bmatrix} 0 \\ 1 \end{Bmatrix}\right),$$

otherwise $$Pa(n) = \begin{Bmatrix} 0 \\ 0 \end{Bmatrix};$$

a fourth determination substep, implemented by a fourth determination submodule of the second computer, consisting in or comprising determining a second bit product pair $$Pb(n) = \begin{Bmatrix} pb0 \\ pb1 \end{Bmatrix}$$

in which pb0 is a specific bit and pb1 is an opposite bit, $$Pb(n) = \begin{Bmatrix} 1 \\ 1 \end{Bmatrix}$$

if $$\left(Rb(n-1) = \begin{Bmatrix} 1 \\ 1 \end{Bmatrix} \text{ or } Rb(n-1) = \begin{Bmatrix} 0 \\ 0 \end{Bmatrix}\right) \text{ and } Sb(n) = \begin{Bmatrix} 1 \\ 1 \end{Bmatrix},$$

Rb(n−1) corresponding to a bit remainder pair determined in the iteration n−1, $$Pb(n) = \begin{Bmatrix} 1 \\ 0 \end{Bmatrix},$$

if $$\left(Rb(n-1) = \begin{Bmatrix} 0 \\ 1 \end{Bmatrix} \text{ and } Sb(n) = \begin{Bmatrix} 1 \\ 1 \end{Bmatrix}\right)$$

$$\text{or} \left(Rb(n-1) = \begin{Bmatrix} 0 \text{ or } 1 \\ 1 \end{Bmatrix} \text{ and } Sb(n) = \begin{Bmatrix} 1 \\ 0 \end{Bmatrix}\right),$$

$$Pb(n) = \begin{Bmatrix} 0 \\ 1 \end{Bmatrix}$$

if $$\left(Rb(n-1) = \begin{Bmatrix} 1 \\ 0 \end{Bmatrix} \text{ and } Sb(n) = \begin{Bmatrix} 1 \\ 1 \end{Bmatrix}\right)$$

$$\text{or} \left(Rb(n-1) = \begin{Bmatrix} 1 \\ 1 \text{ or } 0 \end{Bmatrix} \text{ and } Sb(n) = \begin{Bmatrix} 0 \\ 1 \end{Bmatrix}\right),$$

otherwise $$Pb(n) = \left\{ \begin{array}{c} 0 \\ 0 \end{array} \right\}.$$

According to another particular feature, the remainder pair determination step comprises the following substeps:
a fifth determination substep, implemented by a fifth determination submodule of the first computer, consisting in or comprising determining a first bit remainder pair $$Ra(n) = \left\{ \begin{array}{c} ra0 \\ ra1 \end{array} \right\}$$

in which ra0 is a specific bit, ra1 is an opposite bit and Ra(n)=Sa(n) XOR Pa(n);
a sixth determination substep, implemented by a sixth determination submodule of the second computer, consisting in or comprising determining a second bit remainder pair $$Rb(n) = \left\{ \begin{array}{c} rb0 \\ rb1 \end{array} \right\}$$

in which rb0 is a specific bit, rb1 is an opposite bit and Rb(n)=Sb(n) XOR Pb(n).

In addition, the synchronized signal determination step comprises the following substeps:
a seventh determination substep, implemented by a seventh determination submodule of the first computer, consisting in or comprising determining a first synchronized signal Oa(n),
if $$Pa(n) = \left\{ \begin{array}{c} 0 \\ 0 \end{array} \right\},$$

the first synchronized signal Oa(n) is equal to the first synchronized signal Oa(n−1) in the iteration n−1,
if $$Pa(n) \neq \left\{ \begin{array}{c} 0 \\ 0 \end{array} \right\}$$

and if ra0=0, the first synchronized signal Oa(n) is equal to the control order Ia(n−1) computed by the first computer in the iteration n−1,
if $$Pa(n) \neq \left\{ \begin{array}{c} 0 \\ 0 \end{array} \right\}$$

and if ra0=1, the first synchronized signal Oa(n) is equal to the control order Ia(n−2) computed by the first computer in the iteration n−2;

an eighth determination substep, implemented by an eighth determination submodule of the second computer, consisting in or comprising determining a second synchronized signal Ob(n),
if $$Pb(n) = \left\{ \begin{array}{c} 0 \\ 0 \end{array} \right\},$$

the second synchronized signal Ob(n) is equal to the second synchronized signal Ob(n−1) in the iteration n1,
if $$Pb(n) \neq \left\{ \begin{array}{c} 0 \\ 0 \end{array} \right\}$$

and if rb0=0, the second synchronized signal Ob(n) is equal to the control order Ib(n−1) computed by the second computer in the iteration n−1,
if $$Pb(n) \neq \left\{ \begin{array}{c} 0 \\ 0 \end{array} \right\}$$

and if rb0=1, the second synchronized signal Ob(n) is equal to the control order Ib(n−2) computed by the second computer in the iteration n−2.

The disclosure herein also relates to a system for synchronizing a first computer and a second computer, each of the computers being configured so as to compute control orders intended to control a control surface actuator of an aircraft in accordance with one and the same piloting law, each of the computers comprising a clock, the clocks being synchronized with one another, the first computer having an advance or a delay with respect to the second computer, the advance or the delay being unknown and limited in terms of time.

According to the disclosure herein, the system comprises a set of modules implemented iteratively, the set of modules implemented at each iteration n comprising:
a computing module configured such that each of the computers computes a bit, the bit being equal to 0 if the control order computed by each of the computers in the iteration n is equal to the control order computed in the iteration n−1, the bit otherwise being equal to 1;
an exchange module configured such that each of the computers exchanges the computed bit;
a signal pair determination module configured such that each of the computers determines a bit signal pair, the bit signal pair comprising the bit computed by each of the computers;
a product pair determination module configured such that each of the computers determines a bit product pair, the bit product pair indicating which bit equal to 1 of the bit signal pair determined for one of the computers in the iteration n is equal to the bit of the bit signal pair determined for the other of the computers in the iteration n−1;
a remainder pair determination module configured such that each of the computers determines a bit remainder pair, the bit remainder pair indicating which bit equal to 1 of the bit signal pair determined for one of the computers in the iteration n is different from the bit of the bit signal pair determined for the other of the computers in the iteration n−1;

a synchronized signal determination module configured such that each of the computers determines a synchronized signal based on the bit product pair and on the bit remainder pair.

In addition, the computing module comprises the following submodules:

a first computing submodule of the first computer, configured so as to compute a first bit, the first bit being equal to 0 if the control order Ia(n) computed by the first computer in the iteration n is equal to the control order Ia(n−1) computed in the iteration n−1, the first bit otherwise being equal to 1;

a second computing submodule of the second computer, configured so as to compute a second bit, the second bit being equal to 0 if the control order Ib(n) computed by the second computer in the iteration n is equal to the control order Ib(n−1) computed in the iteration n−1, the second bit otherwise being equal to 1.

Furthermore, the exchange module comprises the following submodules:

a first transmission submodule of the first computer, configured so as to transmit the first bit to the second computer;

a second transmission submodule of the second computer, configured so as to transmit the second bit to the first computer.

Moreover, the signal pair determination module comprises the following submodules:

a first determination submodule of the first computer, configured so as to determine a first bit signal pair $$Sa(n) = \begin{Bmatrix} sa0 \\ sa1 \end{Bmatrix}$$

in which sa0 is a first specific bit equal to the first bit computed in the iteration n−1 and sa1 is a second opposite bit equal to the second bit computed in the iteration n−1;

a second determination submodule of the second computer, configured so as to determine a second bit signal pair $$Sb(n) = \begin{Bmatrix} sb0 \\ sb1 \end{Bmatrix}$$

in which sb0 is a second specific bit equal to the second bit computed in the iteration n−1 and sb1 is a first opposite bit equal to the first bit computed in the iteration n−1.

According to one particular feature, the product pair determination module comprises the following submodules:

a third determination submodule of the first computer, configured so as to determine a first bit product pair $$Pa(n) = \begin{Bmatrix} pa0 \\ pa1 \end{Bmatrix}$$

in which pa0 is a specific bit and pa1 is an opposite bit, $$Pa(n) = \begin{Bmatrix} 1 \\ 1 \end{Bmatrix}$$

if $$\left( Ra(n-1) = \begin{Bmatrix} 1 \\ 1 \end{Bmatrix} \text{ or } Ra(n-1) = \begin{Bmatrix} 0 \\ 0 \end{Bmatrix} \right) \text{ and } Sa(n) = \begin{Bmatrix} 1 \\ 1 \end{Bmatrix},$$

Ra(n−1) corresponding to a bit remainder pair determined in the iteration n−1, $$Pa(n) = \begin{Bmatrix} 1 \\ 0 \end{Bmatrix}$$

if $$\left( Ra(n-1) = \begin{Bmatrix} 0 \\ 1 \end{Bmatrix} \text{ and } Sa(n) = \begin{Bmatrix} 1 \\ 1 \end{Bmatrix} \right) \text{ or }$$

$$\left( Ra(n-1) = \begin{Bmatrix} 0 \text{ or } 1 \\ 1 \end{Bmatrix} \text{ and } Sa(n) = \begin{Bmatrix} 1 \\ 0 \end{Bmatrix} \right),$$

$$Pa(n) = \begin{Bmatrix} 0 \\ 1 \end{Bmatrix}$$

if $$\left( Ra(n-1) = \begin{Bmatrix} 1 \\ 0 \end{Bmatrix} \text{ and } Sa(n) = \begin{Bmatrix} 1 \\ 1 \end{Bmatrix} \right) \text{ or }$$

$$\left( Ra(n-1) = \begin{Bmatrix} 1 \\ 1 \text{ or } 0 \end{Bmatrix} \text{ and } Sa(n) = \begin{Bmatrix} 0 \\ 1 \end{Bmatrix} \right),$$

otherwise $$Pa(n) = \begin{Bmatrix} 0 \\ 0 \end{Bmatrix};$$

a fourth determination submodule of the second computer, configured so as to determine a second bit product pair $$Pb(n) = \begin{Bmatrix} pb0 \\ pb1 \end{Bmatrix}$$

in which pb0 is a specific bit and pb1 is an opposite bit, $$Pb(n) = \begin{Bmatrix} 1 \\ 1 \end{Bmatrix}$$

if $$\left(Rb(n-1) = \begin{Bmatrix} 1 \\ 1 \end{Bmatrix} \text{ or } Rb(n-1) = \begin{Bmatrix} 0 \\ 0 \end{Bmatrix}\right) \text{ and } Sb(n) = \begin{Bmatrix} 1 \\ 1 \end{Bmatrix},$$

Rb(n−1) corresponding to a bit remainder pair determined in the iteration n−1, $$Pb(n) = \begin{Bmatrix} 1 \\ 0 \end{Bmatrix}$$

if $$\left(Rb(n-1) = \begin{Bmatrix} 0 \\ 1 \end{Bmatrix} \text{ and } Sb(n) = \begin{Bmatrix} 1 \\ 1 \end{Bmatrix}\right) \text{ or }$$

$$\left(Rb(n-1) = \begin{Bmatrix} 0 \text{ or } 1 \\ 1 \end{Bmatrix} \text{ and } Sb(n) = \begin{Bmatrix} 1 \\ 0 \end{Bmatrix}\right),$$

$$Pb(n) = \begin{Bmatrix} 0 \\ 1 \end{Bmatrix}$$

if $$\left(Rb(n-1) = \begin{Bmatrix} 1 \\ 0 \end{Bmatrix} \text{ and } Sb(n) = \begin{Bmatrix} 1 \\ 1 \end{Bmatrix}\right) \text{ or }$$

$$\left(Rb(n-1) = \begin{Bmatrix} 1 \\ 1 \text{ or } 0 \end{Bmatrix} \text{ and } Sb(n) = \begin{Bmatrix} 0 \\ 1 \end{Bmatrix}\right),$$

otherwise $$Pb(n) = \begin{Bmatrix} 0 \\ 0 \end{Bmatrix}.$$

According to another particular feature, the remainder pair determination module comprises the following submodules:

a fifth determination submodule of the first computer, configured so as to determine a first bit remainder pair $$Ra(n) = \begin{Bmatrix} ra0 \\ ra1 \end{Bmatrix}$$

in which ra0 is a specific bit, ra1 is an opposite bit and Ra(n)=Sa(n) XOR Pa(n);

a sixth determination submodule of the second computer, configured so as to determine a second bit remainder pair $$Rb(n) = \begin{Bmatrix} rb0 \\ rb1 \end{Bmatrix}$$

in which rb0 is a specific bit, rb1 is an opposite bit and Rb(n)=Sb(n) XOR Pb(n).

In addition, the synchronized signal determination module comprises the following submodules:

a seventh determination submodule of the first computer, configured so as to determine a first synchronized signal Oa(n), if $$Pa(n) = \begin{Bmatrix} 0 \\ 0 \end{Bmatrix},$$

the first synchronized signal Oa(n) is equal to the first synchronized signal Oa(n−1) in the iteration n−1, if $$Pa(n) \neq \begin{Bmatrix} 0 \\ 0 \end{Bmatrix}$$

and if ra0=0, the first synchronized signal Oa(n) is equal to the control order Ia(n−1) computed by the first computer in the iteration n−1, if $$Pa(n) \neq \begin{Bmatrix} 0 \\ 0 \end{Bmatrix}$$

and if ra0=1, the first synchronized signal Oa(n) is equal to the control order Ia(n−2) computed by the first computer in the iteration n−2;

an eighth determination submodule of the second computer, configured so as to determine a second synchronized signal Ob(n), if $$Pb(n) = \begin{Bmatrix} 0 \\ 0 \end{Bmatrix},$$

the second synchronized signal Ob(n) is equal to the second synchronized signal Ob(n−1) in the iteration n−1, if $$Pb(n) \neq \begin{Bmatrix} 0 \\ 0 \end{Bmatrix}$$

and if rb0=0, the second synchronized signal Ob(n) is equal to the control order Ib(n−1) computed by the second computer in the iteration n−1, if $$Pb(n) \neq \begin{Bmatrix} 0 \\ 0 \end{Bmatrix}$$

and if rb0=1, the second synchronized signal Ob(n) is equal to the control order Ib(n−2) computed by the second computer in the iteration n−2.

The disclosure herein also relates to a flight control system for an aircraft, comprising at least one system for synchronizing a first computer and a second computer such as the one specified above.

The disclosure herein also relates to an aircraft, in particular a transport plane, comprising a flight control system such as the one specified above.

BRIEF DESCRIPTION OF THE DRAWINGS

The disclosure herein, with its features and advantages, will become more clearly apparent upon reading the description provided with reference to the appended drawings, in which.

DETAILED DESCRIPTION

Figure 1:
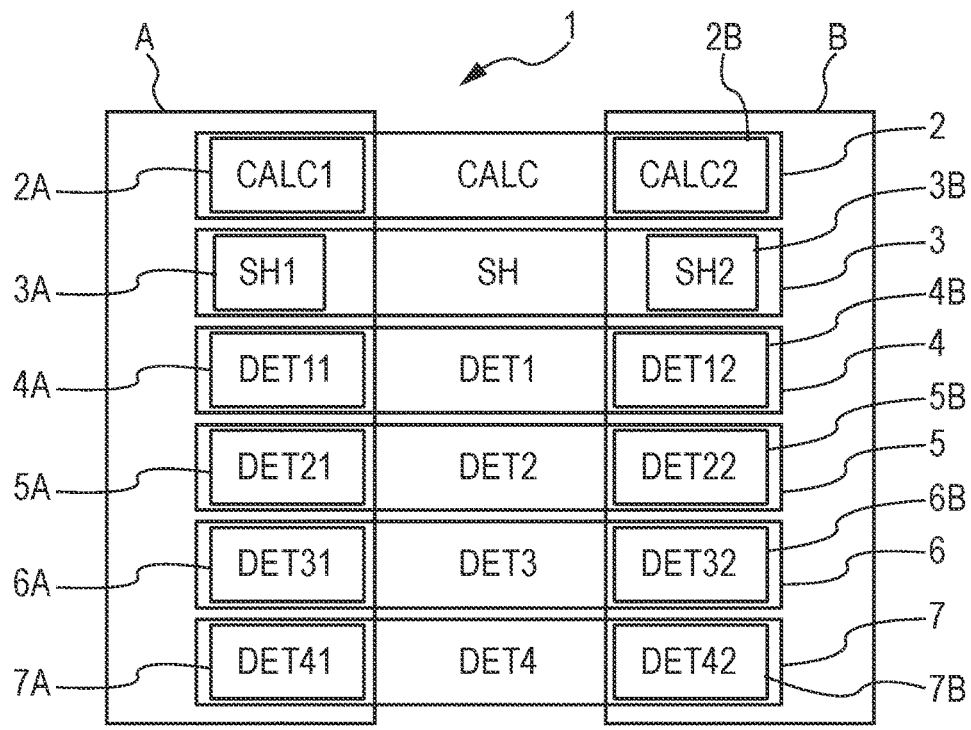
FIG. 1 shows a schematic depiction of the synchronization system.

FIG. 1 shows the system 1 for synchronizing a computer A and a computer B. In the remainder of the description, the synchronization system is called "system 1".

The system 1 is intended to be housed on board an aircraft AC in a flight control system.

Each of the computers A, B is configured so as to compute control orders intended to control a control surface actuator of an aircraft AC based on one and the same piloting law. Each of the computers A, B comprises a clock, the clocks being synchronized with one another. The computer A has an advance or a delay with respect to the computer B. The advance or the delay of a computer A or B with respect to the other computer B or A is unknown. This advance or this delay is however limited in terms of time. This means that the advance or the delay is less than a maximum time difference Tsync. This maximum time difference Tsync is defined below in the description.

The system 1 comprises a set of modules implemented iteratively.

The set of modules implemented for an iteration n comprises at least:
a computing module CALC 2,
an exchange module SH 3,
a signal pair determination module DET1 4,
a product pair determination module DET2 5,
a remainder pair determination module DET3 6 and
a synchronized signal determination module DET4 7.

The computing module 2 is configured such that each of the computers A, B computes a bit (or Boolean). This bit is equal to 0 if the control order computed by each of the computers A, B in the iteration n is equal to the control order computed in the iteration n−1. Otherwise, the bit is equal to 1.

Preferably, the bit is computed before the control order is computed.

The computing module 2 may comprise a computing submodule CALC1 2A contained in the computer A and a computing submodule CALC2 2B contained in the computer B.

The computing submodule 2A of the computer A is configured so as to compute a first bit. The first bit is equal to 0 if the control order Ia(n) computed by the computer A in the iteration n is equal to the control order Ia(n−1) computed in the iteration n−1, otherwise the first bit is equal to 1. The computing submodule 2B of the computer B is configured so as to compute a second bit. The second bit is equal to 0 if the control order Ib(n) computed by the computer B in the iteration n is equal to the control order Ib(n−1) computed in the iteration n−1, otherwise the second bit is equal to 1.

The exchange module 3 is configured such that each of the computers A, B exchanges the computed bit.

The exchange module 3 may comprise a transmission submodule SH1 3A contained in the computer A and a transmission submodule SH2 3B contained in the computer B.

The transmission submodule 3A of the computer A is configured so as to transmit the first bit computed by the computing submodule 2A to the computer B.

The transmission submodule 3B of the computer B is configured so as to transmit the second bit computed by the computing submodule 2B to the computer A.

The first bit corresponds to a specific bit for the computer A and to an opposite bit for the computer B. The second bit corresponds to an opposite bit for the computer A and to a specific bit for the computer B.

Figure 4:
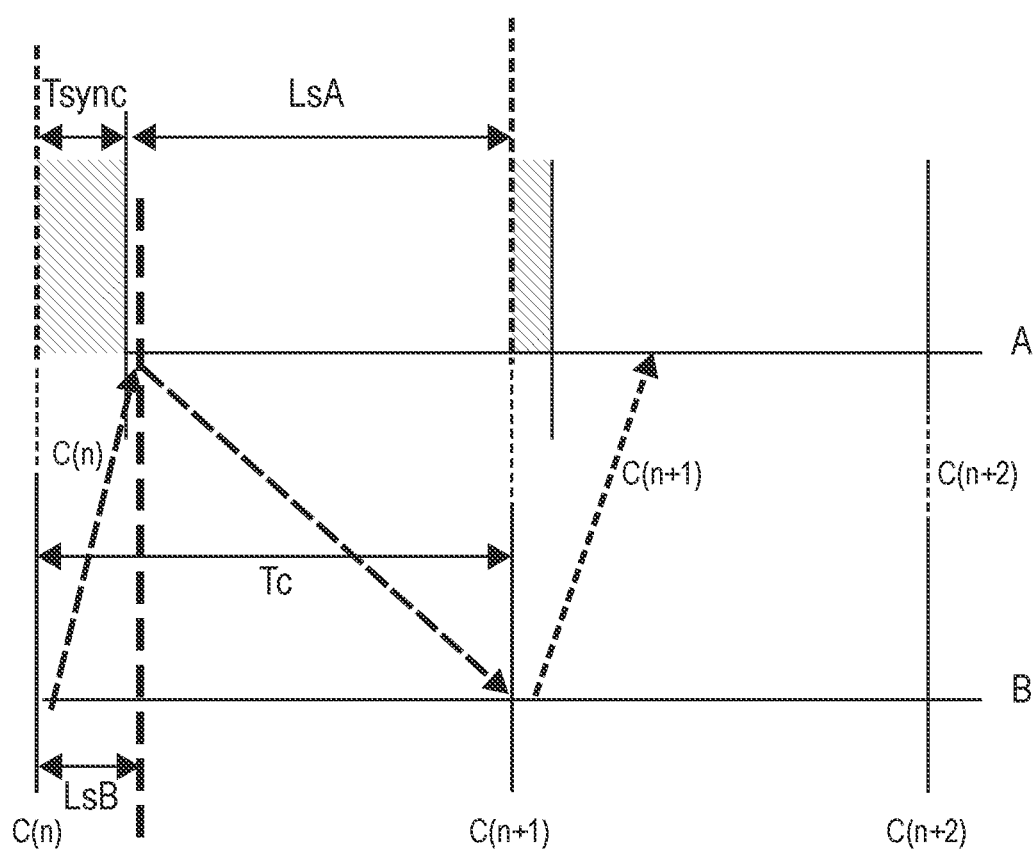
FIG. 4 shows a bit exchange sequence between the two computers.
Figure 5:
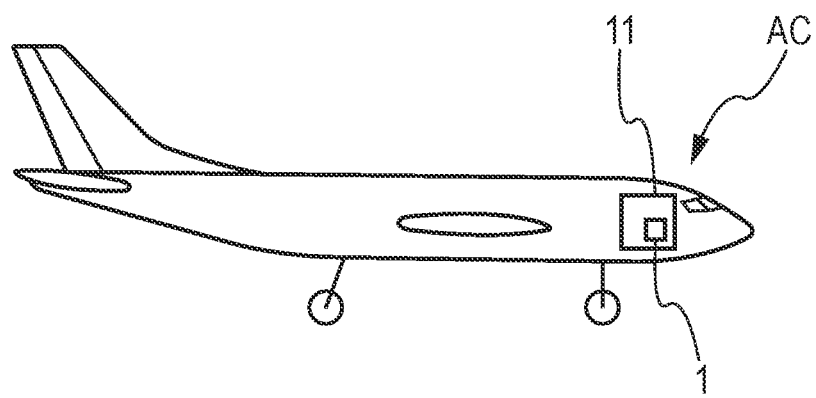
FIG. 5 shows an aircraft with an on-board flight control system comprising the synchronization system.

The clocks having a sampling period Tc of each of the computers A, B may have a maximum time difference Tsync between them. FIG. 4 shows a clock sequence C(n), C(n+1), C(n+2) of the two computers A and B. The clock of the computer A is delayed by Tsync with respect to that of the computer B in the iteration n. This delay decreases in the iteration n+1 and disappears in the iteration n+2. Ls1 represents the minimum latency time for the transmission of a bit from one computer A, B to the other computer B, A. Ls2 represents the maximum latency time for the transmission of a bit from one computer A, B to the other computer B, A. In order for a bit computed by a computer A in an iteration n to be able to be available for the other computer B, A in an iteration n+1 exactly, the transmission latency time Ls1 should be greater than the maximum time difference Tsync (Ls1>Tsync) and less than the difference between the sampling period Tc and the maximum time difference Tsync (Ls2<Tc−2Tsync).

Moreover, it is preferable to choose a sampling period Tc that satisfies the following relationship:

$$\frac{Ts - Ls}{Tc + 2T_{sync}} > 3,$$

in which Ts corresponds to a transmission period of the item of data to be synchronized that is acquired by the two computers A, B. $L_s$ corresponds to the latency time caused by transporting this item of data to each of the computers A, B.

The signal pair determination module 4 is configured such that each of the computers A, B determines a bit pair, called "bit signal pair". The bit signal pair comprises the bit computed by each of the computers A, B.

The signal pair determination module 4 comprises a determination submodule DET11 4A and a determination submodule DET12 4B.

The determination submodule 4A of the computer A is configured so as to determine a first bit signal pair $$Sa(n) = \begin{Bmatrix} sa0 \\ sa1 \end{Bmatrix}$$

in which sa0 is a specific bit equal to the first bit computed in the iteration n−1 by the computing submodule 2A and sa1 is an opposite bit equal to the second bit computed in the iteration n−1 by the computing submodule 2B.

The determination submodule 4B of the computer B is configured so as to determine a second bit signal pair $$Sb(n) = \begin{Bmatrix} sb0 \\ sb1 \end{Bmatrix}$$

in which sb0 is a specific bit equal to the second bit computed in the iteration n−1 by the computing submodule 2B and sb1 is an opposite bit equal to the first bit computed in the iteration n−1 by the computing submodule 2A.

The product pair determination module 5 is configured such that each of the computers A, B determines a bit pair, called "bit product pair". The bit product pair indicates which bit equal to 1 of the bit signal pair determined for one of the computers A, B in the iteration n is equal to the bit of the bit signal pair determined for the other of the computers A, B in the iteration n−1.

The product pair determination module 5 may comprise a determination submodule DET21 5A and a determination submodule DET22 5B.

The determination submodule 5A of the computer A is configured so as to determine a first bit product pair $$Pa(n) = \begin{Bmatrix} pa0 \\ pa1 \end{Bmatrix}$$

in which pa0 is a specific bit and pa1 is an opposite bit.

Pa(n) is determined as follows.

$$Pa(n) =$$

$$\begin{Bmatrix} 1 \\ 1 \end{Bmatrix} \text{ if } \left(Ra(n-1) = \begin{Bmatrix} 1 \\ 1 \end{Bmatrix} \text{ or } Ra(n-1) = \begin{Bmatrix} 0 \\ 0 \end{Bmatrix}\right) \text{ and } Sa(n) = \begin{Bmatrix} 1 \\ 1 \end{Bmatrix}.$$

$$Pa(n) = \begin{Bmatrix} 1 \\ 0 \end{Bmatrix} \text{ if } \left(Ra(n-1) = \begin{Bmatrix} 0 \\ 1 \end{Bmatrix} \text{ and } Sa(n) = \begin{Bmatrix} 1 \\ 1 \end{Bmatrix}\right)$$

$$\text{or } \left(Ra(n-1) = \begin{Bmatrix} 0 \text{ or } 1 \\ 1 \end{Bmatrix} \text{ and } Sa(n) = \begin{Bmatrix} 1 \\ 0 \end{Bmatrix}\right).$$

$$Pa(n) = \begin{Bmatrix} 0 \\ 1 \end{Bmatrix} \text{ if } \left(Ra(n-1) = \begin{Bmatrix} 1 \\ 0 \end{Bmatrix} \text{ and } Sa(n) = \begin{Bmatrix} 1 \\ 1 \end{Bmatrix}\right) \text{ or }$$

$$\left(Ra(n-1) = \begin{Bmatrix} 1 \\ 1 \text{ or } 0 \end{Bmatrix} \text{ and } Sa(n) = \begin{Bmatrix} 0 \\ 1 \end{Bmatrix}\right).$$

$$Pa(n) = \begin{Bmatrix} 0 \\ 0 \end{Bmatrix}$$

in other cases.

Ra(n−1) corresponds to a bit pair, called "bit remainder pair", determined in the iteration n−1. The determination of Ra(n) is explained below in the description.

The determination submodule 5B of the computer B is configured so as to determine a second bit product pair $$Pb(n) = \begin{Bmatrix} pb0 \\ pb1 \end{Bmatrix}$$

in which pb0 is a specific bit and pb1 is an opposite bit.

Pb(n) is determined as follows.

$$Pb(n) =$$

$$\begin{Bmatrix} 1 \\ 1 \end{Bmatrix} \text{ if } \left(Rb(n-1) = \begin{Bmatrix} 1 \\ 1 \end{Bmatrix} \text{ or } Rb(n-1) = \begin{Bmatrix} 0 \\ 0 \end{Bmatrix}\right) \text{ and } Sb(n) = \begin{Bmatrix} 1 \\ 1 \end{Bmatrix}.$$

$$Pb(n) = \begin{Bmatrix} 1 \\ 0 \end{Bmatrix} \text{ if } \left(Rb(n-1) = \begin{Bmatrix} 0 \\ 1 \end{Bmatrix} \text{ and } Sb(n) = \begin{Bmatrix} 1 \\ 1 \end{Bmatrix}\right)$$

$$\text{or } \left(Rb(n-1) = \begin{Bmatrix} 0 \text{ or } 1 \\ 1 \end{Bmatrix} \text{ and } Sb(n) = \begin{Bmatrix} 1 \\ 0 \end{Bmatrix}\right).$$

$$Pb(n) = \begin{Bmatrix} 0 \\ 1 \end{Bmatrix} \text{ if } \left(Rb(n-1) = \begin{Bmatrix} 1 \\ 0 \end{Bmatrix} \text{ and } Sb(n) = \begin{Bmatrix} 1 \\ 1 \end{Bmatrix}\right) \text{ or }$$

$$\left(Rb(n-1) = \begin{Bmatrix} 1 \\ 1 \text{ or } 0 \end{Bmatrix} \text{ and } Sb(n) = \begin{Bmatrix} 0 \\ 1 \end{Bmatrix}\right).$$

$$Pb(n) = \begin{Bmatrix} 0 \\ 0 \end{Bmatrix}$$

in other cases.

Rb(n−1) corresponds to a bit remainder pair determined in the iteration n−1. The determination of Rb(n) is explained below in the description.

The remainder pair determination module 6 is configured such that each of the computers A, B determines a bit pair, called "bit remainder pair". The bit remainder pair indicates which bit equal to 1 of the bit signal pair determined for one of the computers A, B in the iteration n is different from the bit of the bit signal pair determined for the other of the computers A, B in the iteration n−1.

The remainder pair determination module 6 may comprise a determination submodule DET31 6A and a determination submodule DET32 6B.

The determination submodule 6A of the computer A is configured so as to determine a first bit remainder pair $$Ra(n) = \begin{Bmatrix} ra0 \\ ra1 \end{Bmatrix}$$

in which ra0 is a specific bit and ra1 is an opposite bit.

The first bit remainder pair is determined using the following relationship: Ra(n)=Sa(n) XOR Pa(n).

The determination submodule 6B of the computer B is configured so as to determine a second bit remainder pair $$Rb(n) = \begin{Bmatrix} rb0 \\ rb1 \end{Bmatrix}$$

in which rb0 is a specific bit and rb1 is an opposite bit.

The second bit remainder pair is determined using the following relationship: Rb(n)=Sb(n) XOR Pb(n).

The synchronized signal determination module 7 is configured such that each of the computers A, B determines a synchronized signal based on the bit product pair and on the bit remainder pair.

The synchronized signal determination module 7 may comprise a determination submodule DET41 7A and a determination submodule DET42 7B.

The determination submodule 7A of the computer A is configured so as to determine a first synchronized signal Oa(n).

This first synchronized signal Oa(n) is determined as follows.

If $$Pa(n) = \left\{ \begin{array}{c} 0 \\ 0 \end{array} \right\},$$

the first synchronized signal Oa(n) is equal to the synchronized signal Oa(n−1) in the iteration n−1.

If $$Pa(n) \neq \left\{ \begin{array}{c} 0 \\ 0 \end{array} \right\}$$

and if ra0=0, the first synchronized signal Oa(n) is equal to the control order Ia(n−1) computed by the computer A in the iteration n−1.

If $$Pa(n) \neq \left\{ \begin{array}{c} 0 \\ 0 \end{array} \right\}$$

and if ra0=1, the first synchronized signal Oa(n) is equal to the control order Ia(n−2) computed by the computer A in the iteration n−2.

The determination submodule 7B of the computer B is configured so as to determine a second synchronized signal Ob(n).

This second synchronized signal Ob(n) is determined as follows.

If $$Pb(n) = \left\{ \begin{array}{c} 0 \\ 0 \end{array} \right\},$$

the second synchronized signal Ob(n) is equal to the second synchronized signal Ob(n−1) in the iteration n−1.

If $$Pb(n) \neq \left\{ \begin{array}{c} 0 \\ 0 \end{array} \right\}$$

and if rb0=0, the second synchronized signal Ob(n) is equal to the control order Ib(n−1) computed by the computer B in the iteration n−1.

If $$Pb(n) \neq \left\{ \begin{array}{c} 0 \\ 0 \end{array} \right\}$$

and if rb0=1, the second synchronized signal Ob (n) is equal to the control order Ib(n−2) computed by the computer B in the iteration n−2.

Moreover, it is considered that, in the first iteration n=N, the following bit pairs are set in the iteration N−1 as follows:

$$Ra(N-1) = Sa(N-1) = Rb(N-1) = Sb(N-1) = \left\{ \begin{array}{c} 0 \\ 0 \end{array} \right\}.$$

Figure 3:
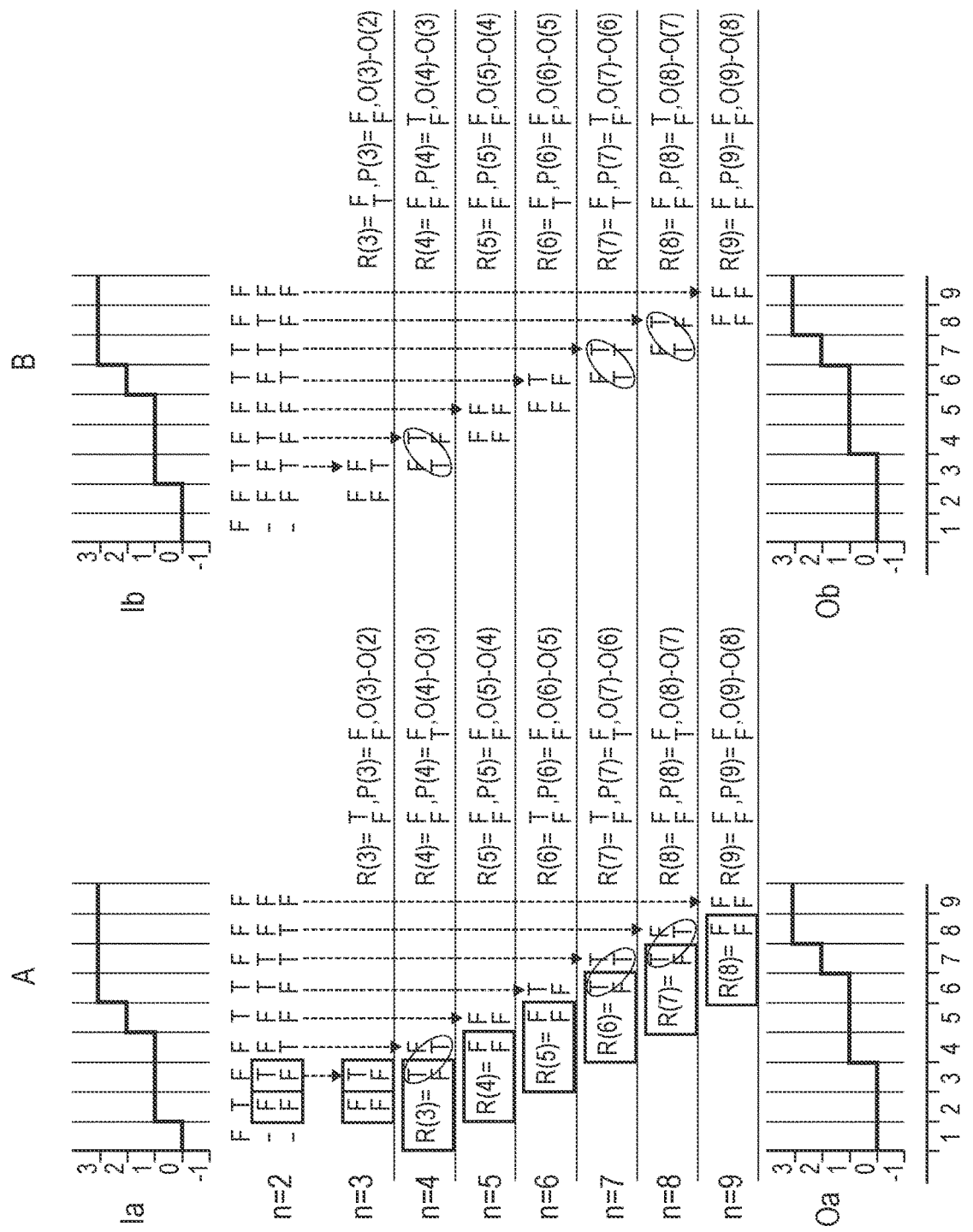
FIG. 3 schematically illustrates one example of the operation of the synchronization system.

FIG. 3 illustrates one exemplary implementation of the system 1.

The right-hand column relates to the computer A and the left-hand column relates to the computer B. The first row shows graphs showing an example of control orders Ia, Ib computed respectively by the computer A and the computer B. It is noted that the control order Ib is delayed by one iteration with respect to the control order Ia.

The last row shows graphs showing the synchronized signals Oa, Ob determined by the system 1. It is noted that these signals Oa and Ob are synchronized.

The determination of the various bit pairs is shown between the two rows of graphs.

The letter F means "false" and corresponds to a bit equal to 0. The letter T means "true" and corresponds to a bit equal to 1. In order not to overload the figure, brackets have not been used.

In iteration n=1 (not shown), no synchronization is performed. Therefore, Oa(1)=Ia(1) and Ob(1)=Ib(1).

In iteration n=2:

$$Ra(2) = Sa(2) = Rb(2) = Sb(2) = \left\{ \begin{array}{c} 0 \\ 0 \end{array} \right\}.$$

No synchronization is therefore performed.

Therefore, Oa(2)=Oa(1) and Ob(2)=Ob(1).

In iteration n=3:

For the computer A, Ia(2) is different from Ia(1), but Ib(2) is equal to Ib(1). Thus, $$Sa(3) = \left\{ \begin{array}{c} 1 \\ 0 \end{array} \right\} \text{ and } Ra(2) = \left\{ \begin{array}{c} 0 \\ 0 \end{array} \right\}.$$

Consequently, $$Pa(3) = \left\{ \begin{array}{c} 0 \\ 0 \end{array} \right\}.$$

Therefore, Oa(3)=Oa(2).

For the computer B, Ib(2) is equal to Ib(1), but Ia(2) is different from Ia(1). Thus, $$Sb(3) = \left\{ \begin{array}{c} 0 \\ 1 \end{array} \right\} \text{ and } Rb(2) = \left\{ \begin{array}{c} 0 \\ 0 \end{array} \right\}.$$

Consequently, $$Pb(3) = \begin{Bmatrix} 0 \\ 0 \end{Bmatrix}.$$

Therefore, Ob(3)=Ob(2).

In iteration n=4:

For the computer A, Ia(3) is equal to Ia(2) and Ib(3) is different from Ib(2). Thus, $$Sa(4) = \begin{Bmatrix} 0 \\ 1 \end{Bmatrix} \text{ and } Ra(3) = \begin{Bmatrix} 1 \\ 0 \end{Bmatrix}.$$

Consequently, $$Pa(4) = \begin{Bmatrix} 0 \\ 1 \end{Bmatrix}.$$

Therefore, Oa(4)=Ia(3).

For the computer B, Ib(3) is different from Ib(2) and Ia(3) is equal to Ia(2). Thus, $$Sb(4) = \begin{Bmatrix} 1 \\ 0 \end{Bmatrix} \text{ and } Rb(3) = \begin{Bmatrix} 0 \\ 1 \end{Bmatrix}.$$

Consequently, $$Pb(4) = \begin{Bmatrix} 1 \\ 0 \end{Bmatrix}.$$

Therefore, Ob(4)=Ib(3).

In iteration n=5:

For the computer A, Ia(4) is equal to Ia(3) and Ib(4) is equal to Ib(3). Thus, $$Sa(5) = \begin{Bmatrix} 0 \\ 0 \end{Bmatrix} \text{ and } Ra(4) = \begin{Bmatrix} 0 \\ 0 \end{Bmatrix}.$$

Consequently, $$Pa(5) = \begin{Bmatrix} 0 \\ 0 \end{Bmatrix}.$$

Therefore, Oa(5)=Oa(4).

For the computer B, Ib(4) is equal to Ib(3) and Ia(4) is equal to Ia(3). Thus, $$Sb(5) = \begin{Bmatrix} 0 \\ 0 \end{Bmatrix} \text{ and } Rb(4) = \begin{Bmatrix} 0 \\ 0 \end{Bmatrix}.$$

Consequently $$Pb(5) = \begin{Bmatrix} 0 \\ 0 \end{Bmatrix}.$$

Therefore, Ob(5)=Ob(4).

In iteration n=6:

For the computer A, Ia(5) is different from Ia(4), but Ib(5) is equal to Ib(4). Thus, $$Sa(6) = \begin{Bmatrix} 1 \\ 0 \end{Bmatrix} \text{ and } Ra(5) = \begin{Bmatrix} 0 \\ 0 \end{Bmatrix}.$$

Consequently, $$Pa(6) = \begin{Bmatrix} 0 \\ 0 \end{Bmatrix}.$$

Therefore, Oa(6)=Oa(5).

For the computer B, Ib(5) is equal to Ib(4), but Ia(5) is different from Ia(4). Thus, $$Sb(6) = \begin{Bmatrix} 0 \\ 1 \end{Bmatrix} \text{ and } Rb(5) = \begin{Bmatrix} 0 \\ 0 \end{Bmatrix}.$$

Consequently, $$Pb(6) = \begin{Bmatrix} 0 \\ 0 \end{Bmatrix}.$$

Therefore, Ob(6)=Ob(5).

In iteration n=7:

For the computer A, Ia(6) is different from Ia(5) and Ib(6) is different from Ib(5). Thus, $$Sa(7) = \begin{Bmatrix} 1 \\ 1 \end{Bmatrix} \text{ and } Ra(6) = \begin{Bmatrix} 1 \\ 0 \end{Bmatrix}.$$

Consequently, $$Pa(7) = \begin{Bmatrix} 0 \\ 1 \end{Bmatrix}.$$

Therefore, Oa(7)=Ia(5).

For the computer B, Ib(6) is different from Ib(5) and Ia(6) is different from Ib(5). Thus, $$Sb(7) = \begin{Bmatrix} 1 \\ 1 \end{Bmatrix} \text{ and } Rb(6) = \begin{Bmatrix} 0 \\ 1 \end{Bmatrix}.$$

Consequently, $$Pb(7) = \begin{Bmatrix} 1 \\ 0 \end{Bmatrix}.$$

Therefore, Ob(7)=Ib(6).

In iteration n=8:

For the computer A, Ia(7) is equal to Ia(6), but Ib(7) is different from Ib(6). Thus, $$Sa(8) = \begin{Bmatrix} 0 \\ 1 \end{Bmatrix} \text{ and } Ra(7) = \begin{Bmatrix} 1 \\ 0 \end{Bmatrix}.$$

Consequently, $$Pa(8) = \begin{Bmatrix} 0 \\ 1 \end{Bmatrix}.$$

Therefore, Oa(8)=Ia(7).

For the computer B, Ib(7) is different from Ib(6) but Ia(7) is equal to Ia(6). Thus, $$Sb(8) = \begin{Bmatrix} 1 \\ 0 \end{Bmatrix} \text{ and } Rb(7) = \begin{Bmatrix} 0 \\ 1 \end{Bmatrix}.$$

Consequently, $$Pb(8) = \begin{Bmatrix} 1 \\ 0 \end{Bmatrix}.$$

Therefore, Ob(8)=Ib(7).

In iteration n=9:

For the computer A, Ia(8) is equal to Ia(7) and Ib(8) is equal to Ib(7). Thus, $$Sa(9) = \begin{Bmatrix} 0 \\ 0 \end{Bmatrix} \text{ and } Ra(8) = \begin{Bmatrix} 0 \\ 0 \end{Bmatrix}.$$

Consequently, $$Pa(9) = \begin{Bmatrix} 0 \\ 0 \end{Bmatrix}.$$

Therefore, Oa(9)=Oa(8).

For the computer B, Ib(8) is equal to Ib(7) and Ia(8) is equal to Ia(7). Thus, $$Sb(9) = \begin{Bmatrix} 0 \\ 0 \end{Bmatrix} \text{ and } Rb(8) = \begin{Bmatrix} 0 \\ 0 \end{Bmatrix}.$$

Consequently, $$Pb(9) = \begin{Bmatrix} 0 \\ 0 \end{Bmatrix}.$$

Therefore, Ob(9)=Ob(8).

Figure 2:
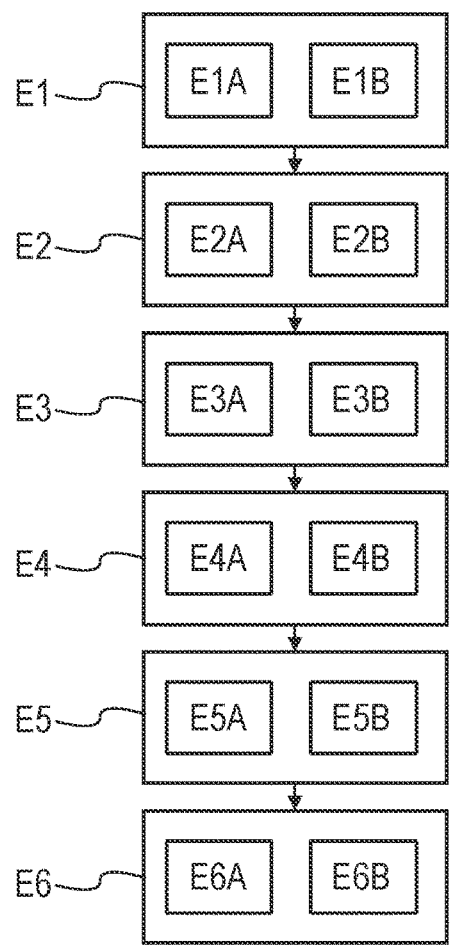
FIG. 2 shows a schematic depiction of the synchronization method.

The disclosure herein also relates to a method for synchronizing a computer A and a computer B (FIG. 2).

The method comprises a set of steps implemented iteratively.

The set of steps implemented in each iteration n comprises:

a computing step E1, implemented by the computing module 2, consisting in or comprising each of the computers A, B computing a bit, the bit being equal to 0 if the control order computed by each of the computers A, B in the iteration n is equal to the control order computed in the iteration n−1, the bit otherwise being equal to 1;

an exchange step E2, implemented by the exchange module 3, consisting in or comprising each of the computers A, B exchanging the computed bit;

a signal pair determination step E3, implemented by the signal pair determination module 4, consisting in or comprising each of the computers A, B determining a bit signal pair, the bit signal pair comprising the bit computed by each of the computers A, B;

a product pair determination step E4, implemented by the product pair determination module 5, consisting in or comprising each of the computers A, B determining a bit product pair, the bit product pair indicating which bit equal to 1 of the bit signal pair determined for one of the computers A, B in the iteration n is equal to the bit of the bit signal pair determined for the other of the computers A, B in the iteration n−1;

a remainder pair determination step E5, implemented by the remainder pair determination module 6, consisting in or comprising each of the computers A, B determining a bit remainder pair, the bit remainder pair indicating which bit equal to 1 of the bit signal pair determined for one of the computers A, B in the iteration n is different from the bit of the bit signal pair determined for the other of the computers A, B in the iteration n−1;

a synchronized signal determination step E6, implemented by the synchronized signal determination module 7, consisting in or comprising each of the computers A, B determining a synchronized signal based on the bit product pair and on the bit remainder pair.

The computing step E1 may comprise the following substeps:

a computing substep E1A, implemented by the computing submodule 2A of the computer A, consisting in or comprising computing a first bit, the first bit being equal to 0 if the control order Ia(n) computed by the first computer A in the iteration n is equal to the control order Ia(n−1) computed in the iteration n−1 by the computer A, the first bit otherwise being equal to 1;

a computing substep E1B, implemented by the computing submodule 2B of the computer B, consisting in or comprising computing a second bit, the second bit being equal to 0 if the control order Ib(n) computed by the computer B in the iteration n is equal to the control order Ib(n−1) computed in the iteration n−1 by the computer B, the second bit otherwise being equal to 1.

The exchange step E2 may comprise the following substeps:
- a transmission substep E2A, implemented by the transmission submodule 3A of the computer A, consisting in or comprising transmitting the first bit computed by the computer A to the computer B;
- a transmission substep E2B, implemented by the transmission submodule 3B of the computer B, consisting in or comprising transmitting the second bit computed by the computer B to the computer A.

The signal pair determination step E3 may comprise the following substeps:
- a determination substep E3A, implemented by the determination submodule 4A of the computer A, consisting in or comprising determining a first bit signal pair $$Sa(n) = \begin{Bmatrix} sa0 \\ sa1 \end{Bmatrix}$$

in which sa0 is a specific bit equal to the first bit computed in the iteration n−1 and sa1 is an opposite bit equal to the second bit computed in the iteration n−1;
- a determination substep E3B, implemented by the determination submodule 4B of the computer B, consisting in or comprising determining a second bit signal pair $$Sb(n) = \begin{Bmatrix} sb0 \\ sb1 \end{Bmatrix}$$

in which sb0 is a specific bit equal to the second bit computed in the iteration n−1 and sb1 is an opposite bit equal to the first bit computed in the iteration n−1.

The product pair determination step E4 may comprise the following substeps:
- a determination substep E4A, implemented by the determination submodule 5A of the computer A, consisting in or comprising determining a first bit product pair $$Pa(n) = \begin{Bmatrix} pa0 \\ pa1 \end{Bmatrix}$$

in which pa0 is a specific bit and pa1 is an opposite bit, $$Pa(n) = \begin{Bmatrix} 1 \\ 1 \end{Bmatrix}$$

if $$\left( Ra(n-1) = \begin{Bmatrix} 1 \\ 1 \end{Bmatrix} \text{ or } Ra(n-1) = \begin{Bmatrix} 0 \\ 0 \end{Bmatrix} \right) \text{ and } Sa(n) = \begin{Bmatrix} 1 \\ 1 \end{Bmatrix},$$

Ra(n−1) corresponding to a bit remainder pair determined in the iteration n−1, $$Pa(n) = \begin{Bmatrix} 1 \\ 0 \end{Bmatrix}$$

if $$\left( Ra(n-1) = \begin{Bmatrix} 0 \\ 1 \end{Bmatrix} \text{ and } Sa(n) = \begin{Bmatrix} 1 \\ 1 \end{Bmatrix} \right) \text{ or }$$

$$\left( Ra(n-1) = \begin{Bmatrix} 0 \text{ or } 1 \\ 1 \end{Bmatrix} \text{ and } Sa(n) = \begin{Bmatrix} 1 \\ 0 \end{Bmatrix} \right),$$

$$Pa(n) = \begin{Bmatrix} 0 \\ 1 \end{Bmatrix}$$

if $$\left( Ra(n-1) = \begin{Bmatrix} 1 \\ 0 \end{Bmatrix} \text{ and } Sa(n) = \begin{Bmatrix} 1 \\ 1 \end{Bmatrix} \right) \text{ or }$$

$$\left( Ra(n-1) = \begin{Bmatrix} 1 \\ 1 \text{ or } 0 \end{Bmatrix} \text{ and } Sa(n) = \begin{Bmatrix} 0 \\ 1 \end{Bmatrix} \right),$$

otherwise $$Pa(n) = \begin{Bmatrix} 0 \\ 0 \end{Bmatrix};$$

- a determination substep E4B, implemented by the determination submodule 5B of the computer B, consisting in or comprising determining a second bit product pair $$Pb(n) = \begin{Bmatrix} pb0 \\ pb1 \end{Bmatrix}$$

in which pb0 is a specific bit and pb1 is an opposite bit, $$Pb(n) = \begin{Bmatrix} 1 \\ 1 \end{Bmatrix}$$

if $$\left( Rb(n-1) = \begin{Bmatrix} 1 \\ 1 \end{Bmatrix} \text{ or } Rb(n-1) = \begin{Bmatrix} 0 \\ 0 \end{Bmatrix} \right) \text{ and }$$

$$Sb(n) = \begin{Bmatrix} 1 \\ 1 \end{Bmatrix},$$

Rb(n−1) corresponding to a bit remainder pair determined in the iteration n−1, $$Pb(n) = \begin{Bmatrix} 1 \\ 0 \end{Bmatrix} \text{ if } \left( Rb(n-1) = \begin{Bmatrix} 0 \\ 1 \end{Bmatrix} \text{ and } Sb(n) = \begin{Bmatrix} 1 \\ 1 \end{Bmatrix} \right) \text{ or }$$

$$\left(Rb(n-1) = \left\{\begin{array}{c} 0 \text{ or } 1 \\ 1 \end{array}\right\} \text{ and } Sb(n) = \left\{\begin{array}{c} 1 \\ 0 \end{array}\right\}\right),$$

$$Pb(n) = \left\{\begin{array}{c} 0 \\ 1 \end{array}\right\}$$

if $$\left(Rb(n-1) = \left\{\begin{array}{c} 1 \\ 0 \end{array}\right\} \text{ and } Sb(n) = \left\{\begin{array}{c} 1 \\ 1 \end{array}\right\}\right) \text{ or }$$

$$\left(Rb(n-1) = \left\{\begin{array}{c} 1 \\ 1 \text{ or } 0 \end{array}\right\} \text{ and } Sb(n) = \left\{\begin{array}{c} 0 \\ 1 \end{array}\right\}\right),$$

otherwise $$Pb(n) = \left\{\begin{array}{c} 0 \\ 0 \end{array}\right\}.$$

The remainder pair determination step E5 may comprise the following substeps:

a determination substep E5A, implemented by the determination submodule 6A of the computer A, consisting in or comprising determining a first bit remainder pair $$Ra(n) = \left\{\begin{array}{c} ra0 \\ ra1 \end{array}\right\}$$

in which ra0 is a specific bit, ra1 is an opposite bit and Ra(n)=Sa(n) XOR Pa(n);

a determination substep E5B, implemented by the determination submodule 6B of the computer B, consisting in or comprising determining a second bit remainder pair $$Rb(n) = \left\{\begin{array}{c} rb0 \\ rb1 \end{array}\right\}$$

in which rb0 is a specific bit, rb1 is an opposite bit and Rb(n)=Sb(n) XOR Pb(n).

The synchronized signal determination step E6 may comprise the following substeps:

a determination substep E6A, implemented by the determination submodule 7A of the computer A, consisting in or comprising determining a first synchronized signal Oa(n), if $$Pa(n) = \left\{\begin{array}{c} 0 \\ 0 \end{array}\right\},$$

the first synchronized signal Oa(n) is equal to the first synchronized signal Oa(n−1) in the iteration n−1, if $$Pa(n) \neq \left\{\begin{array}{c} 0 \\ 0 \end{array}\right\}$$

and if ra0=0, the first synchronized signal Oa(n) is equal to the control order Ia(n−1) computed by the computer A in the iteration n−1, if $$Pa(n) \neq \left\{\begin{array}{c} 0 \\ 0 \end{array}\right\}$$

and if ra0=1, the first synchronized signal Oa(n) is equal to the control order Ia(n−2) computed by the computer A in the iteration n−2;

a determination substep E6B, implemented by the determination submodule 7B of the computer B, consisting in or comprising determining a second synchronized signal Ob(n), if $$Pb(n) = \left\{\begin{array}{c} 0 \\ 0 \end{array}\right\},$$

the second synchronized signal Ob(n) is equal to the second synchronized signal Ob(n−1) in the iteration n−1, if $$Pb(n) \neq \left\{\begin{array}{c} 0 \\ 0 \end{array}\right\}$$

and if rb0=0, the second synchronized signal Ob(n) is equal to the control order Ib(n−1) computed by the computer B in the iteration n−1, if $$Pb(n) \neq \left\{\begin{array}{c} 0 \\ 0 \end{array}\right\}$$

and if rb0=1, the second synchronized signal Ob(n) is equal to the control order Ib(n−2) computed by the computer B in the iteration n−2.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for synchronizing a first computer and a second computer, the method comprising:
   synchronizing a clock of the first computer with a clock of the second computer, wherein the first computer has an advance or a delay with respect to the second computer, the advance or the delay being unknown and limited in terms of time;
   the method comprising, implemented iteratively, in each iteration:
   computing, by each of the first and second computers, a control order, by which a control surface actuator of an aircraft is controlled in accordance with a piloting law;
   a computing step comprising computing, by each of the first and second computers, a bit, wherein:
      the bit computed by the first computer is equal to 0 when the control order computed in an iteration n is equal to a control order computed in an iteration n−1, otherwise the bit computed by the first computer is equal to 1; and
      the bit computed by the second computer is equal to 0 when the control order computed in the iteration n is equal to a control order computed in the iteration n−1, otherwise the bit computed by the second computer is equal to 1;
   an exchange step comprising exchanging the bit computed by the first computer and the bit computed by the second computer between the first and second computers;
   a signal pair determination step comprising determining, each of the first and second computers, a bit signal pair, wherein the bit signal pair comprises the bit computed by the first computer and the bit computed by the second computer;
   a product pair determination step comprising determining, by each of the first and second computers, a bit product pair, wherein the bit product pair indicates:
      when one or both of the bits of the bit signal pair for the first computer is equal to 1 in the iteration n, which of the bits equal to 1 in the bit signal pair of the first computer is equal to a corresponding bit of a bit signal pair determined for the second computer in the iteration n−1; and
      when one or both of the bits of the bit signal pair for the second computer is equal to 1 in the iteration n, which of the bits equal to 1 in the bit signal pair of the second computer is equal to a corresponding bit of a bit signal pair determined for the first computer in the iteration n−1;
   a remainder pair determination step comprising determining, by each of the first and second computers, a bit remainder pair, wherein the bit remainder pair indicates:
      when one or both of the bits of the bit signal pair for the first computer is equal to 1 in the iteration n, which of the bits equal to 1 in the bit signal pair of the first computer is different from the corresponding bit of the bit signal pair determined for the second computer in the iteration n−1; and
      when one or both of the bits of the bit signal pair for the second computer is equal to 1 in the iteration n, which of the bits equal to 1 in the bit signal pair of the second computer is different from the corresponding bit of a bit signal pair determined for the first computer in the iteration n−1; and
   a synchronized signal determination step comprising determining, by each of the first and second computers, a synchronized signal based on the bit product pair and the bit remainder pair.

2. The method of claim 1, wherein:
   the bit computed by the first computer is a first bit, the first bit being equal to 0 when a control order Ia(n) computed by the first computer in the iteration n is equal to a control order Ia(n−1) computed in the iteration n−1, otherwise the first bit being equal to 1; and
   the bit computed by the second computer is a second bit, the second bit being equal to 0 when a control order Ib(n) computed by the second computer in the iteration n is equal to a control order Ib(n−1) computed in the iteration n−1, otherwise the second bit being equal to 1.

3. The method of claim 2, wherein the exchange step comprises:
   transmitting, by the first computer, the first bit to the second computer; and
   transmitting, by the second computer, the second bit to the first computer.

4. The method of claim 2, wherein the signal pair determination step comprises:
   determining, by the first computer, a first bit signal pair in $$Sa(n) = \left\{ \begin{array}{c} sa0 \\ sa1 \end{array} \right\},$$

in which sb0 is a specific bit equal to a first bit computed in the iteration n−1 and sb1 is an opposite bit equal to a second bit computed in the iteration n−1; and
   determining, by the second computer, a second bit signal pair $$Sb(n) = \left\{ \begin{array}{c} sb0 \\ sb1 \end{array} \right\},$$

in which sb0 is a specific bit equal to the second bit computed in the iteration n−1 and sb1 is an opposite bit equal to the first bit computed in the iteration n−1.

5. The method of claim 1, wherein the product pair determination step comprises:
   determining, by the first computer, a first bit product pair $$Pa(n) = \left\{ \begin{array}{c} pa0 \\ pa1 \end{array} \right\},$$

in which pa0 is a specific bit and pa1 is an opposite bit, wherein:

$$Pa(n) = \begin{Bmatrix} 1 \\ 1 \end{Bmatrix}$$

when $$Ra(n-1) = \begin{Bmatrix} 1 \\ 1 \end{Bmatrix} \text{ or } Ra(n-1) = \begin{Bmatrix} 0 \\ 0 \end{Bmatrix} \text{ and } Sa(n) = \begin{Bmatrix} 1 \\ 1 \end{Bmatrix},$$

Ra(n−1) corresponding to the bit remainder pair determined in the iteration n−1, $$Pa(n) = \begin{Bmatrix} 1 \\ 0 \end{Bmatrix}$$

when $$\left(Ra(n-1) = \begin{Bmatrix} 0 \\ 1 \end{Bmatrix} \text{ and } Sa(n) = \begin{Bmatrix} 1 \\ 1 \end{Bmatrix}\right) \text{ or}$$
$$\left(Ra(n-1) = \begin{Bmatrix} 0 \text{ or } 1 \\ 1 \end{Bmatrix} \text{ and } Sa(n) = \begin{Bmatrix} 1 \\ 0 \end{Bmatrix}\right),$$

$$Pa(n) = \begin{Bmatrix} 0 \\ 1 \end{Bmatrix}$$

when $$\left(Ra(n-1) = \begin{Bmatrix} 1 \\ 0 \end{Bmatrix} \text{ and } Sa(n) = \begin{Bmatrix} 1 \\ 1 \end{Bmatrix}\right) \text{ or}$$
$$\left(Ra(n-1) = \begin{Bmatrix} 1 \\ 1 \text{ or } 0 \end{Bmatrix} \text{ and } Sa(n) = \begin{Bmatrix} 0 \\ 1 \end{Bmatrix}\right),$$

and
otherwise, $$Pa(n) = \begin{Bmatrix} 0 \\ 0 \end{Bmatrix};$$

and
determining, by the second computer, a second bit product pair $$Pb(n) = \begin{Bmatrix} pb0 \\ pb1 \end{Bmatrix},$$

in which pb0 is a specific bit and pb1 is an opposite bit, wherein:

$$Pb(n) = \begin{Bmatrix} 1 \\ 1 \end{Bmatrix}$$

when $$\left(Rb(n-1) = \begin{Bmatrix} 1 \\ 1 \end{Bmatrix} \text{ or } Rb(n-1) = \begin{Bmatrix} 0 \\ 0 \end{Bmatrix}\right) \text{ and } Sb(n) = \begin{Bmatrix} 1 \\ 1 \end{Bmatrix},$$

Rb(n−1) corresponding to the bit remainder pair determined in the iteration n−1, $$Pb(n) = \begin{Bmatrix} 1 \\ 0 \end{Bmatrix}$$

when $$\left(Rb(n-1) = \begin{Bmatrix} 0 \\ 1 \end{Bmatrix} \text{ and } Sb(n) = \begin{Bmatrix} 1 \\ 1 \end{Bmatrix}\right) \text{ or}$$
$$\left(Rb(n-1) = \begin{Bmatrix} 0 \text{ or } 1 \\ 1 \end{Bmatrix} \text{ and } Sb(n) = \begin{Bmatrix} 1 \\ 0 \end{Bmatrix}\right),$$

$$Pb(n) = \begin{Bmatrix} 0 \\ 0 \end{Bmatrix}$$

when $$\left(Rb(n-1) = \begin{Bmatrix} 1 \\ 0 \end{Bmatrix} \text{ and } Sb(n) = \begin{Bmatrix} 1 \\ 1 \end{Bmatrix}\right) \text{ or}$$
$$\left(Rb(n-1) = \begin{Bmatrix} 1 \\ 1 \text{ or } 0 \end{Bmatrix} \text{ and } Sb(n) = \begin{Bmatrix} 0 \\ 1 \end{Bmatrix}\right),$$

and otherwise, $$Pb(n) = \begin{Bmatrix} 0 \\ 1 \end{Bmatrix}.$$

6. The method of claim 1, wherein the remainder pair determination step comprises:
determining, by the first computer, a first bit remainder pair $$Ra(n) = \begin{Bmatrix} ra0 \\ ra1 \end{Bmatrix},$$

in which ra0 is a specific bit, ra1 is an opposite bit, and Ra(n)=Sa(n) XOR Pa(n); and
determining, by the second computer, a second bit remainder pair $$Rb(n) = \begin{Bmatrix} rb0 \\ rb1 \end{Bmatrix},$$

in which rb0 is a specific bit, rb1 is an opposite bit, and Rb(n)=Sb(n) XOR Pb(n).

7. The method of claim 1, wherein the synchronized signal determination step comprises:
determining, by the first computer, a first synchronized signal Oa(n), wherein:

$$Pa(n) = \left\{ \begin{matrix} 0 \\ 0 \end{matrix} \right\},$$

when me first synchronized signal Oa(n) is equal to a first synchronized signal Oa(n−1) in the iteration n−1, when $$Pa(n) \neq \left\{ \begin{matrix} 0 \\ 0 \end{matrix} \right\}$$

and ra0=0, the first synchronized signal Oa(n) is equal to a control order Ia(n−1) computed by the first computer in the iteration n−1, and
when $$Pa(n) \neq \left\{ \begin{matrix} 0 \\ 0 \end{matrix} \right\}$$

and ra0=1, the first synchronized signal Oa(n) is equal to a control order Ia(n−2) computed by the first computer in an iteration n−2; and
determining, by the second computer, a second synchronized signal Ob(n), wherein:
when $$Pb(n) = \left\{ \begin{matrix} 0 \\ 0 \end{matrix} \right\},$$

the second synchronized signal Ob(n) is equal to a second synchronized signal Ob(n−1) in the iteration n−1,
when $$Pb(n) \neq \left\{ \begin{matrix} 0 \\ 0 \end{matrix} \right\}$$

and rb0 =0, the second synchronized signal Ob(n) is equal to a control order Ib(n−1) computed by the second computer in the iteration n−1, and
when $$Pb(n) \neq \left\{ \begin{matrix} 0 \\ 0 \end{matrix} \right\}$$

and rb0 =1, the second synchronized signal Ob(n) is equal to a control order Ib(n−2) computed by the second computer in the iteration n−2.

8. A system for synchronizing a first computer and a second computer, the system comprising:
the first computer comprising a clock; and
the second computer comprising a clock;
wherein the clock of the first computer is synchronized to the clock of the second computer; and
wherein the first computer has an advance or a delay with respect to the second computer, the advance or the delay being unknown and limited in terms of time;
wherein the system is iteratively configured to, in each iteration:
compute, by each of the first and second computers, a control order, by which a control surface actuator of an aircraft is controlled in accordance with a piloting law;
compute, by each of the first and second computers, a bit, wherein:
the bit computed by the first computer is equal to 0 when the control order computed in an iteration n is equal to the control order computed in an iteration n−1, otherwise the bit computed by the first computer is equal to 1; and
the bit computed by the second computer is equal to 0 when the control order computed in the iteration n is equal to a control order computed in the iteration n−1, otherwise the bit computed by the second computer is equal to 1,
exchange the bit computed by the first computer and the bit computed by the second computer between the first and second computers;
determine, by each of the first and second computers, a bit signal pair, wherein the bit signal pair comprises the bit computed by the first computer and the bit computed by the second computer;
determine, by each of the first and second computers, a bit product pair, wherein the bit product pair indicates:
when one or both of the bits of the bit signal pair for the first computer is equal to 1 in the iteration n, which of the bits equal to 1 in the bit signal pair of the first computer is equal to a corresponding bit of a bit signal pair determined for the second computer in the iteration n−1; and
when one or both of the bits of the bit signal pair for the second computer is equal to 1 in the iteration n, which of the bits equal to 1 in the bit signal pair of the second computer is equal to a corresponding bit of a bit signal pair determined for the first computer in the iteration n−1;
determine, by each of the first and second computers, a bit remainder pair, wherein the bit remainder pair indicates
when one or both of the bits of the bit signal pair for the first computer is equal to 1 in the iteration n, which of the bits equal to 1 in the bit signal pair of the first computer is different from the corresponding bit of the bit signal pair determined for the second computer in the iteration n−1; and
when one or both of the bits of the bit signal pair for the second computer is equal to 1 in the iteration n, which of the bits equal to 1 in the bit signal pair of the second computer is different from the corresponding bit of a bit signal pair determined for the first computer in the iteration n−1; and
determine, by each of the first and second computers, a synchronized signal based on the bit product pair and the bit remainder pair.

9. The system of claim 8, wherein:
the bit computed by the first computer is a first bit, the first bit being equal to 0 when a control order Ia(n) computed by the first computer in the iteration n is equal to a control order Ia(n−1) computed in the iteration n−1, otherwise the first bit being equal to 1; and
the bit computed by the second computer is a second bit, the second bit being equal to 0 when a control order Ib(n) computed by the second computer in the iteration n is equal to a control order Ib(n−1) computed in the iteration n−1, otherwise the second bit being equal to 1.

10. The system of claim 9, wherein, in exchanging the computed bit:
   the first computer is configured to transmit the first bit to the second computer; and
   the second computer is configured to transmit the second bit to the first computer.

11. The system of claim 9, wherein, in determining the bit signal pair:

$$Sa(n) = \begin{Bmatrix} sa0 \\ sa1 \end{Bmatrix},$$

the first computer is configured to determine a first bit signal pair in which sa0 is a first specific bit equal to a first bit computed in the iteration n−1 and sa1 is a second opposite bit equal to a second bit computed in the iteration n−1; and the second computer is configured to determine a second bit signal pair $$Sb(n) = \begin{Bmatrix} sb0 \\ sb1 \end{Bmatrix},$$

in which sb0 is a second specific bit equal to the second bit computed in the iteration n−1 and sb1 is a first opposite bit equal to the first bit computed in the iteration n−1.

12. The system of claim 8, wherein, in determining the bit product pair:
   the first computer is configured to determine a first bit product pair $$Pa(n) = \begin{Bmatrix} pa0 \\ pa1 \end{Bmatrix},$$

in which pa0 is a specific bit and pa1 is an opposite bit, wherein:

$$Pa(n) = \begin{Bmatrix} 1 \\ 1 \end{Bmatrix}$$

when $$\left(Ra(n-1) = \begin{Bmatrix} 1 \\ 1 \end{Bmatrix} \text{ or } Ra(n-1) = \begin{Bmatrix} 0 \\ 0 \end{Bmatrix}\right) \text{ and }$$

$$Sa(n) = \begin{Bmatrix} 1 \\ 1 \end{Bmatrix},$$

Ra(n−1) corresponding to the bit remainder pair determined in the iteration n−1, $$Pa(n) = \begin{Bmatrix} 1 \\ 0 \end{Bmatrix}$$

when $$\left(Ra(n-1) = \begin{Bmatrix} 0 \\ 1 \end{Bmatrix} \text{ and } Sa(n) = \begin{Bmatrix} 1 \\ 1 \end{Bmatrix}\right) \text{ or}$$

-continued $$\left(Ra(n-1) = \begin{Bmatrix} 0 \text{ or } 1 \\ 1 \end{Bmatrix} \text{ and } Sa(n) = \begin{Bmatrix} 1 \\ 0 \end{Bmatrix}\right),$$

$$Pa(n) = \begin{Bmatrix} 0 \\ 1 \end{Bmatrix}$$

when $$\left(Ra(n-1) = \begin{Bmatrix} 1 \\ 0 \end{Bmatrix} \text{ and } Sa(n) = \begin{Bmatrix} 1 \\ 1 \end{Bmatrix}\right) \text{ or}$$

$$\left(Ra(n-1) = \begin{Bmatrix} 1 \\ 1 \text{ or } 0 \end{Bmatrix} \text{ and } Sa(n) = \begin{Bmatrix} 0 \\ 1 \end{Bmatrix}\right),$$

and Sa(n)=$\begin{Bmatrix} 0 \\ 1 \end{Bmatrix}$), and otherwise, $$Pa(n) = \begin{Bmatrix} 0 \\ 0 \end{Bmatrix};$$

and the second computer is configured to determine a second bit product pair $$Pb = \begin{Bmatrix} pb0 \\ pb1 \end{Bmatrix},$$

in which pb0 is a specific bit and pb1 is an opposite bit, wherein:

$$Pb(n) = \begin{Bmatrix} 1 \\ 1 \end{Bmatrix}$$

when $$\left(Rb(n-1) = \begin{Bmatrix} 1 \\ 1 \end{Bmatrix} \text{ or } Rb(n-1) = \begin{Bmatrix} 0 \\ 0 \end{Bmatrix}\right) \text{ and } Sb(n) = \begin{Bmatrix} 1 \\ 1 \end{Bmatrix},$$

Rb(n−1) corresponding to the bit remainder pair determined in the iteration n−1, $$Pb(n) = \begin{Bmatrix} 1 \\ 0 \end{Bmatrix}$$

when $$\left(Rb(n-1) = \begin{Bmatrix} 0 \\ 1 \end{Bmatrix} \text{ and } Sb(n) = \begin{Bmatrix} 1 \\ 1 \end{Bmatrix}\right) \text{ or}$$

$$\left(Rb(n-1) = \begin{Bmatrix} 0 \text{ or } 1 \\ 1 \end{Bmatrix} \text{ and } Sb(n) = \begin{Bmatrix} 1 \\ 0 \end{Bmatrix}\right),$$

$$Pb(n) = \left\{ \begin{matrix} 0 \\ 1 \end{matrix} \right\}$$

when $$\left( Rb(n-1) = \left\{ \begin{matrix} 1 \\ 0 \end{matrix} \right\} \text{ and } Sb(n) = \left\{ \begin{matrix} 1 \\ 1 \end{matrix} \right\} \right) \text{ or}$$

$$\left( Rb(n-1) = \left\{ \begin{matrix} 1 \\ 1 \text{ or } 0 \end{matrix} \right\} \text{ and } Sb(n) = \left\{ \begin{matrix} 0 \\ 1 \end{matrix} \right\} \right),$$

and $Sb(n) = \{^0_1\}$), and
otherwise, $$Pb(n) = \left\{ \begin{matrix} 0 \\ 0 \end{matrix} \right\}.$$

13. The system of claim 8, wherein, in determining the bit remainder pair:
the first computer is configured to determine a first bit remainder pair $$Ra(n) = \left\{ \begin{matrix} ra0 \\ ra1 \end{matrix} \right\},$$

in which ra0 is a specific bit, ra1 is an opposite bit, and $Ra(n) = Sa(n)$ XOR $Pa(n)$; and
the second computer is configured to determine a second bit remainder pair $$Rb(n) = \left\{ \begin{matrix} rb0 \\ rb1 \end{matrix} \right\},$$

in which rb0 is a specific bit, rb1 is an opposite bit, and $Rb(n) = Sb(n)$ XOR $Pb(n)$.

14. The system of claim 8, wherein, in determining the synchronized signal:
the first computer is configured to determine a first synchronized signal Oa(n), wherein:
when $$Pa(n) = \left\{ \begin{matrix} 0 \\ 0 \end{matrix} \right\},$$

the first syncnronized signal Oa(n) is equal to the first synchronized signal Oa(n−1) in the iteration n−1,
when $$Pa(n) \neq \left\{ \begin{matrix} 0 \\ 0 \end{matrix} \right\}$$

and ra0=0, the first synchronized signal Oa(n) is equal to the control order Ia(n−1) computed by the first computer in the iteration n−1, and
when $$Pa(n) \neq \left\{ \begin{matrix} 0 \\ 0 \end{matrix} \right\}$$

and ra0=1, the first synchronized signal Oa(n) is equal to the control order Ia(n−2) computed by the first computer in an iteration n−2; and
the second computer is configured to determine a second synchronized signal Ob(n), wherein:
when $$Pb(n) = \left\{ \begin{matrix} 0 \\ 0 \end{matrix} \right\},$$

the second synchronized signal Ob(n) is equal to the second synchronized signal Ob(n−1) in the iteration n−1,
when $$Pb(n) \neq \left\{ \begin{matrix} 0 \\ 0 \end{matrix} \right\}$$

and rb0=0, the second synchronized signal Ob(n) is equal to the control order Ib(n−1) computed by the second computer in the iteration n−1, and
when $$Pb(n) \neq \left\{ \begin{matrix} 0 \\ 0 \end{matrix} \right\}$$

and rb0=1, the second synchronized signal Ob(n) is equal to the control order Ib(n−2) computed by the second computer in the iteration n−2.

15. A flight control system for an aircraft, comprising at least one system of claim 8.

16. An aircraft comprising the flight control system of claim 15.

* * * * *